US010694245B2

(12) United States Patent
Gefen

(10) Patent No.: US 10,694,245 B2
(45) Date of Patent: Jun. 23, 2020

(54) DEVICE, SYSTEM, AND METHOD FOR GAME ENHANCEMENT USING CROSS-AUGMENTATION

(71) Applicant: Disney Enterprises, Inc., Burbank, CA (US)

(72) Inventor: Smadar Gefen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/387,735

(22) Filed: Apr. 18, 2019

(65) Prior Publication Data

US 2019/0246171 A1 Aug. 8, 2019

Related U.S. Application Data

(63) Continuation of application No. 15/694,040, filed on Sep. 1, 2017, now Pat. No. 10,284,907.

(Continued)

(51) Int. Cl.
| | |
|---|---|
| *H04N 7/18* | (2006.01) |
| *H04N 21/44* | (2011.01) |
| *H04N 21/2187* | (2011.01) |
| *H04N 21/41* | (2011.01) |
| *H04N 21/218* | (2011.01) |
| *H04N 21/414* | (2011.01) |
| *H04N 21/4728* | (2011.01) |
| *H04N 21/222* | (2011.01) |

(52) U.S. Cl.
CPC ... *H04N 21/44016* (2013.01); *H04N 21/2187* (2013.01); *H04N 21/21805* (2013.01); *H04N 21/4126* (2013.01); *H04N 21/41407* (2013.01); *H04N 21/4728* (2013.01); *H04N 21/2223* (2013.01)

(58) Field of Classification Search
CPC ....... H04N 21/44016; H04N 21/41407; H04N 21/4728; H04N 21/2187; H04N 21/4126; H04N 21/21805; H04N 21/2223
USPC .......................................................... 725/74
See application file for complete search history.

(56) References Cited

U.S. PATENT DOCUMENTS

| | | | |
|---|---|---|---|
| 8,363,102 B1 * | 1/2013 | Kadoch ................... | H04N 7/18 348/148 |
| 8,893,164 B1 * | 11/2014 | Teller ................. | H04N 21/4307 725/12 |

(Continued)

*Primary Examiner* — Michael B. Pierorazio
(74) *Attorney, Agent, or Firm* — Fay Kaplun & Marcin, LLP

(57) ABSTRACT

A device, system, and method generates augmentations for an enhanced display. The method performed at an enhancement server includes receiving device data from a plurality of client devices associated with respective users attending an event at a venue, the client devices configured to capture data associated with the event in the venue. The method includes determining a first client device of the client devices in which an augmentation is to be shown based on the device data. The method includes determining a second client device of the client devices that captured second data corresponding to the augmentation. The method includes facilitating an exchange of the second data with the first client device, the second data being used to augment the first data by generating an enhanced data based on the first and second data for presentation to a first user associated with the first client device.

20 Claims, 4 Drawing Sheets

Related U.S. Application Data

(60) Provisional application No. 62/405,728, filed on Oct. 7, 2016.

(56) References Cited

U.S. PATENT DOCUMENTS

| | | | | |
|---|---|---|---|---|
| 2007/0162487 | A1* | 7/2007 | Frailey | H04N 7/165 |
| 2009/0087161 | A1* | 4/2009 | Roberts | G11B 27/031 |
| | | | | 386/282 |
| 2009/0148124 | A1* | 6/2009 | Athsani | G06Q 30/02 |
| | | | | 386/241 |
| 2009/0204885 | A1* | 8/2009 | Ellsworth | G06F 16/489 |
| | | | | 715/234 |
| 2010/0002084 | A1* | 1/2010 | Hattori | G11B 27/034 |
| | | | | 348/207.1 |
| 2010/0075685 | A1* | 3/2010 | Axnas | H04L 1/0001 |
| | | | | 455/450 |
| 2010/0254295 | A1* | 10/2010 | Ahn | H04N 21/2383 |
| | | | | 370/312 |
| 2012/0020307 | A1* | 1/2012 | Henderson | H04W 28/16 |
| | | | | 370/329 |
| 2012/0040714 | A1* | 2/2012 | Wu | H04B 1/3877 |
| | | | | 455/552.1 |
| 2012/0075168 | A1* | 3/2012 | Osterhout | G02B 27/017 |
| | | | | 345/8 |
| 2012/0192242 | A1* | 7/2012 | Kellerer | G06F 16/78 |
| | | | | 725/116 |
| 2012/0229655 | A1* | 9/2012 | Solomon | H04N 5/2251 |
| | | | | 348/207.1 |
| 2013/0070047 | A1* | 3/2013 | DiGiovanni | H04N 5/222 |
| | | | | 348/36 |
| 2013/0104173 | A1* | 4/2013 | Tjio | H04N 21/2187 |
| | | | | 725/62 |
| 2014/0157336 | A1* | 6/2014 | Deegan | H04L 65/605 |
| | | | | 725/91 |

* cited by examiner

DEVICE, SYSTEM, AND METHOD FOR GAME ENHANCEMENT USING CROSS-AUGMENTATION

PRIORITY CLAIM/INCORPORATION BY REFERENCE

The present application claims priority to U.S. Provisional Application Ser. No. 62/405,728 filed on Oct. 7, 2016 entitled "Game Enhancement via Cross-Augmentation" naming Smadar Gefen as an inventor, the entirety of this application being incorporated by reference herein.

BACKGROUND INFORMATION

A venue may host an event in which an audience of spectators may attend to view the event live. For example, a stadium may host a sporting event in which a plurality of spectators may attend. The venue may include a seating arrangement in which each audience member may purchase a specific seat and view the event from a perspective of the assigned seat. For example, the spectator may purchase a ticket for a particular seat at a designated level and section of the stadium. Thus, for the duration of the event, the spectator may be limited to view the event from the perspective of the seat.

While the spectators are attending the event, the spectators may respectively have and use a personal client device. The client device may have a capability of connecting to a local or wide area wired or wireless network. By connecting the client device to a network that provides a streaming or display service, the spectator may be allowed to receive information associated with the event or view the event from a predetermined perspective. For example, the event may be broadcast over a television network by capturing the event using cameras. The spectator may use the client device to connect to a website or via an application of the television network and view the event based on how the television network selects to show the event. However, the spectators are limited to viewing the event from the assigned seat or from the predetermined perspective being shown over the network.

DETAILED DESCRIPTION

Figure 1:
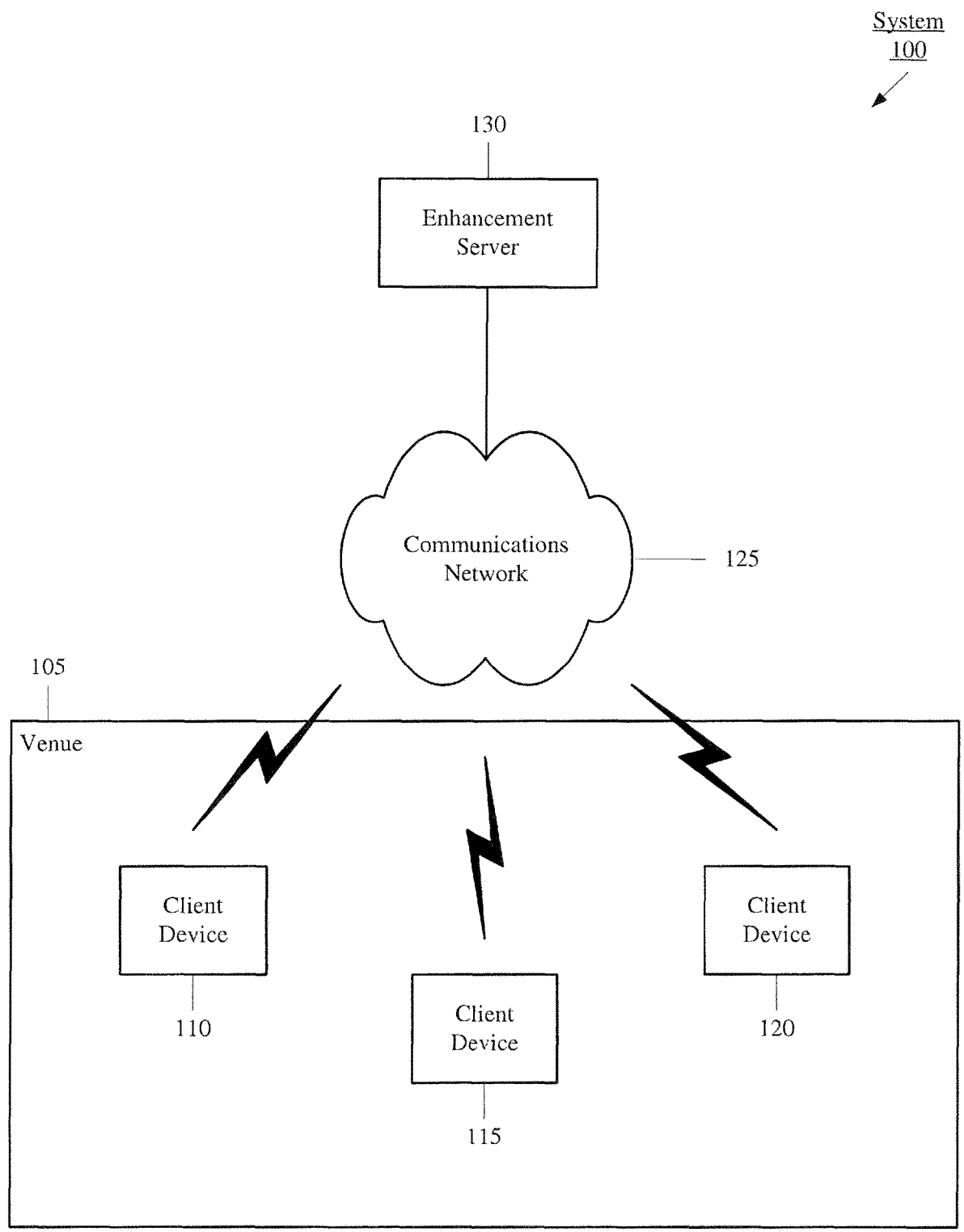
FIG. 1 shows a system according to the exemplary embodiments.

The exemplary embodiments may be further understood with reference to the following description and the related appended drawings, wherein like elements are provided with the same reference numerals. The exemplary embodiments are related to a device, a system, and a method for enhancing a first display on a first client device through augmentation using information received from a second client device. Specifically, the exemplary embodiments are configured to opportunistically utilize data captured by the first and second client devices during an event being attended by a first user associated with the first client device and a second user associated with the second client device. The exemplary embodiments may utilize the captured data to enhance the first display as well as other displays (e.g., other client devices, a network broadcast, an online stream, etc.). As will be described in further detail below, the exemplary embodiments may provide the enhancement functionality based on predetermined settings received from the first client device.

It is noted that the exemplary embodiments are described primarily with respect to enhancing a display on a client device located in a venue, the client device being associated with a user who is attending a live event hosted at the venue. However, the exemplary embodiments may be configured or modified to be used in any scenario where the user of the client device has a limited perspective of a region of interest at any event. It is also noted that the exemplary embodiments are described with respect to enhancing the display based on information received from a further client device located in the venue, the further client device being associated with a further user who is also attending the live event hosted at the venue. However, the exemplary embodiments may be configured or modified to enhance the display using any information associated with captured data of the event. For example, the information may be from a hosting entity that has cameras positioned throughout the venue (e.g., both interior and exterior to the venue), from an aerial entity that has a camera positioned over the venue, etc. Accordingly, first data being captured by a first client device may be enhanced with second data captured by a second client device to generate enhanced data. This enhanced data may be used to generate an enhanced display that is displayed on the first client device (or any client device).

An event held at a venue may be attended by spectators and each spectator may have a particular perspective to view the event. In a particular scenario, a plurality of spectators may attend a sporting event in which the game (e.g., a football game) is played in a central area (e.g., a football field) of the venue (e.g., a football stadium) and the spectators are seated around this central area. Thus, a first spectator may be seated to have a first perspective (e.g., behind a first end zone) while a second spectator may be seated to have a second perspective (e.g., at mid-field). With the unpredictable nature and frequent changes in a region of interest during the game at any time and at any location, the quality of the perspective of a given spectator may fluctuate. For example, while a first sequence of actions is taking place (e.g., an offensive drive near the first end zone), the first perspective may be better than the second perspective. However, while a second sequence of actions is taking place (e.g., a series of downs occurring between the 35 yard lines), the second perspective may be better than the first perspective.

The ubiquity of client devices wherever the respective users are located may present an opportunity to enhance available services that may be rendered on the client devices. For example, technological developments to recording components (e.g. embedded cameras or microphones) of the client devices in the hands of spectators at an event may allow for higher quality and efficiency in capturing content from the perspective of the spectator. Specifically, a first user may use a first client device to record an area of interest of the event from a first perspective while a second user may use a second client device to record the area of interest from a second perspective different from the first perspective.

Furthermore, there have been advances in streaming technologies that allow for a reliable transfer of recorded data from one client device directly to another client device, from a client device to a server that may process and redistribute the recorded data within a reasonable latency to another client device, etc. In this manner, the recorded data using the recording components may be exchanged among client devices or a network component. Using the recording components and streaming technologies, there may be an opportunity for content synergy that enables a single client device to display content from a variety of different perspectives along with additional information that may be presented (e.g., as an inlay or an overlay).

The exemplary embodiments are configured to enhance the display of a client device by augmenting how data captured by the client device is shown through incorporation of data captured by a further client device to generate enhanced data. By utilizing the recording components and streaming capabilities of client devices, the exemplary embodiments provide a mechanism for synergy of data captured by multiple client devices so that a certain client's data visualization may be enhanced by other clients' data. For example, multiple clients' data when fused may provide novel perspectives or presentations of an event being attended by a user of the client device capturing the certain client's data. Specifically, the mechanism according to the exemplary embodiments may leverage concurrently captured videos or images from advantageous perspectives from one or more first client devices to augment a display of video or images captured on one or more second client devices. In this manner, the enhanced display corresponding to the generated enhanced data may provide content synergy where the content may be presented from a plurality of different angles or locations. The content synergy may apply to any type of content such as video, images, audio, graphics, text, any other type of sensory data, or a combination thereof. For illustrative purposes, any reference to the enhanced display may entail generating the corresponding enhanced data (e.g., by an enhancement server or by a client device).

By taking advantage of the ubiquity of client devices in the hands of the spectators attending an event in a venue, the exemplary embodiments may achieve a plurality of objectives. In a first example, the exemplary embodiments may provide a cross-augmentation feature. Specifically, a first user may be able to augment a second user's event experience. For example, the first user may be capturing an area of interest of the event from a first vantage point (e.g., from a specific seat in the venue). This first vantage point may be relevant or complementary to the second user's interests or to a second vantage point. Based on the second user's settings or preferences indicating the interests or second vantage point, the exemplary embodiments may be configured to deliver the content received from a first client device of the first user (with potential modifications) to a second client device of the second person to augment the second user's displayed content. In a second example, the exemplary embodiments may provide a crowdsourcing-based content generation feature. Specifically, a production or broadcast entity (collectively referred to herein as "production entity") associated with the event may capture videos, images, audio, or other types of sensory data as well as associated metadata from spectators attending the event. The production entity may use the captured data in producing the content of the event (e.g., in a live capacity or in post-production). By utilizing this feature, the production entity may benefit from content captured from unique perspectives (e.g., content that is occluded from the broadcast camera's perspective) as well as extract information from a large number of samples (e.g., consisting of the spectators' data and the associated metadata). Additionally, this feature may provide the spectators an opportunity to contribute to the programming which may be an exciting and attractive feature.

FIG. 1 shows a system 100 according to the exemplary embodiments. The system 100 relates to a communication between various components involved in enhancing a display of data by augmenting captured data on a first client device with captured data from a second client device or, by fusing data captured on one or more client devices and presenting it on the first client device. Thus, the system 100 may include a plurality of client devices 110, 115, 120 located at a venue 105. The system 100 may also include an enhancement server 130 that may connect to the client devices 110-120 via a communication network 125. As will be described in further detail below, the system 100 is configured to receive and possibly further process captured data from select client devices, determine other select client devices that are to have enhanced displays, and distribute to the other select client devices the received and possibly further processed captured data. It is noted that the system 100 may include further components such as recording components associated with a production entity for the event, recording components associated with the venue, sources of data associated with characters/players/performers of the event, etc. As will be described in detail below, the system 100 may utilize any available data to generate the enhanced display for any of the client devices 110-120.

The venue 105 may be any location in which an event may be held. The venue 105 may include a seating or spectating area in which spectators may be allowed to view the event based on a predetermined licensing agreement (e.g., a ticket to attend the event). For example, the venue 105 may be an enclosed space such as a stadium, a building, an arena, etc. or an open space such as a park, a street, etc. Thus, if the event is a sporting event, the game may take place in a central area of the venue 105 while the spectators may view the game in a surrounding area around the central area. If the event is a concert, the performance may take place in a front area of the venue 105 while the spectators may view the performance in front of the front area. If the event is a marathon, the race may take place across a predefined geographic area along designated roads while the spectators may view the race on sidewalks/shoulders off the roads. For illustrative purposes, the venue 105 will be described as a sporting stadium where the event is a sporting event and the spectators are seated around a central area from where the game is being played. However, it is noted that the exemplary embodiments may be utilized for any type of venue 105 and for any type event being held at the venue 105 in which the spectators who are attending view the event live.

The client devices 110-120 may represent any electronic device used by spectators attending the event being held at the venue 105. For example, the client devices 110-120 may be a portable device such as a mobile phone, a tablet computer, a smartphone, a phablet, an embedded device, a wearable, a Cat-M device, a Cat-M1 device, etc. As will be described in further detail below, the client devices 110-120 may include the necessary hardware, software, or firmware to perform the various operations associated with showing an enhanced display to a respective user. The client devices 110-120 may also include the required connectivity hardware, software, and firmware (e.g., transceiver) to establish a connection with the communications network 125 to further establish a connection with the other components of the system 100 such as other client devices 110-120 and the enhancement server 130.

It should be understood that an actual system 100 may include any number of client devices 110-120 being used by any number of users and being associated with any number of these users where the user may be associated with one or more of the client devices 110-120. That is, the example of three (3) client devices 110-120 is only provided for illustrative purposes. In fact, those skilled in the art will understand that a sporting event held at the venue 105 may potentially have thousands, tens of thousands, or even hundreds of thousands of spectators, each of the spectators or a majority of the spectators having a respective client device. Moreover, some of these client devices may be operated by dedicated production personnel with the purpose of collecting data from various venue locations to facilitate content enhancement for a broadcasting entity.

The communications network 125 may be configured to communicatively connect the various components of the system 100 to exchange data. The communications network 125 may represent any single or plurality of networks used by the components of the system 100 to communicate with one another. For example, the communications network 110 may be a private network for the venue 105 in which spectators attending an event hosted at the venue 105 may connect to access services such as the enhancement feature according to the exemplary embodiments. The private network may also connect to a network of an Internet Service Provider to connect to the Internet when the enhancement feature is provided over the Internet. In another example, the communications network 110 may be a wide area network in which a coverage includes the venue 105 to access the enhancement feature according to the exemplary embodiments. It should be noted that the communications network 125 and all networks that may be included therein may be any type of network. For example, the communications network 125 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc.

It is noted that the use of the communications network 125 is only exemplary. That is, according to a first manner of communication, the exemplary embodiments may use a centralized communication hub. However, according to a second manner of communication, the exemplary embodiments may use a direct communication pathway between the client devices 110-120 using, for example, short-range communication protocols (e.g., Bluetooth, near field communications, etc.). To reach all available client devices in the venue 105, a network of the client devices 110-120 may be created where the client devices 110-120 may be used as relays for client devices that are outside the operating area of the short-range communication protocol. For example, the client device 110 may be within the operating area of the short-range communication protocol with the client device 115 and outside the operating area of the short-range communication protocol with the client device 120. However, the client device 115 may be within the operating area of the short-range communication protocol with the client device 120. In this manner, the client device 110 may establish a communication pathway with the client device 120 via the client device 115. Thus, the communications network 125 may represent any manner in which a communication pathway between the client devices 110-120 or the enhancement server 130 may be established.

Figure 2:
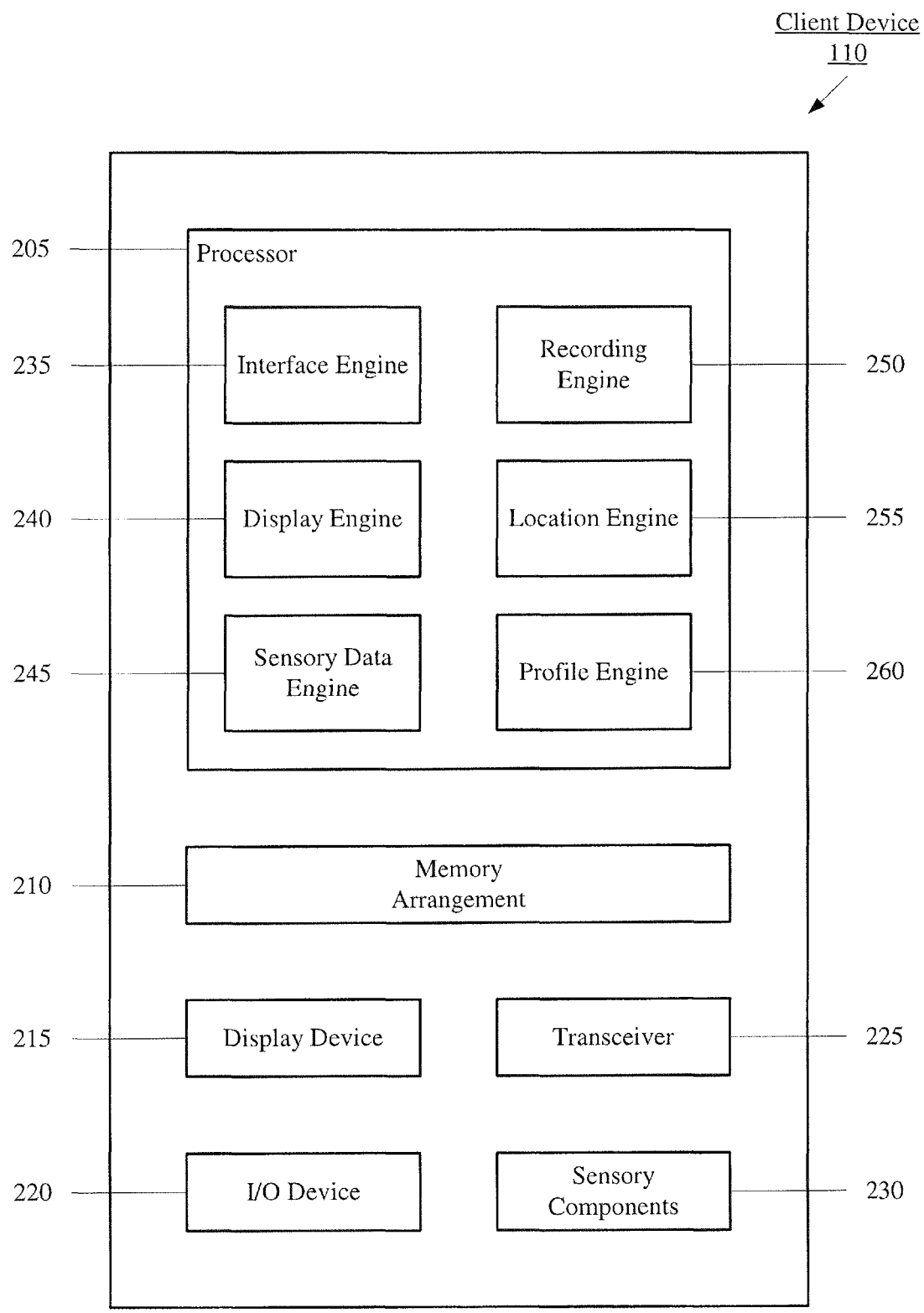
FIG. 2 shows a client device of the system of FIG. 1 according to the exemplary embodiments.

The exemplary embodiments relate to the client device 110 connecting to the communications network 125 to utilize the enhancement feature provided by the enhancement server 130. FIG. 2 shows the client device 110 of the system 100 of FIG. 1 according to the exemplary embodiments. Specifically, the client device 110 is configured to execute a plurality of engines that perform functionalities associated with utilizing the enhancement feature. It is noted that the client device 110 being configured with the features of the exemplary embodiments is only exemplary. That is, the client device 110 may also represent the client devices 115, 120.

The client device 110 may represent any electronic device that is configured to show data to a user and may be representative of one or more of the client devices 110-120 (examples of which are noted above). The client device 110 may include a processor 205, a memory arrangement 210, a display device 215, an input/output (I/O) device 220, a transceiver 225, and sensory components 230. The client device 110 may include other components such as, for example, an audio output device, a battery that provides a limited power supply, a data acquisition device, ports to electrically connect the client device 110 to other electronic devices, etc.

The processor 205 may be configured to execute a plurality of engines of the client device 110. For example, the engines may include an interface engine 235, a display engine 240, a sensory data engine 245, a recording engine 250, a location engine 255, and a profile engine 260. As will be described in further detail below, the interface engine 235 may be configured to provide a user interface associated with the enhancement functionality. The display engine 240 may be configured to show data to a user including an enhanced display received from the enhancement server 130 or generate the enhanced display based on data received from the enhancement server 130. The sensory data engine 245 may be configured to receive raw sensory data for processing/formatting. The recording engine 250 may be configured to receive the processed sensory data from the sensory data engine 245 and store the processed sensory data (e.g., as recorded data). The location engine 255 may be configured to determine a location of the client device 110 in a global manner or relative to a position within the venue 105. The profile engine 260 may be configured to manage settings or personal preferences of the user of the client device 110 with regard to how the enhancement functionality is to be used on the client device 110.

It should be noted that the above described engines each being an application (e.g., a program) executed by the processor 205 is only exemplary. The functionality associated with the engines may also be represented as a separate incorporated component of the client device 110 or may be a modular component coupled to the client device 110, e.g., an integrated circuit with or without firmware. For example, the integrated circuit may include input circuitry to receive signals and processing circuitry to process the signals and other information. In addition, in some client devices, the functionality described for the processor 205 is split among a plurality of processors. The exemplary embodiments may be implemented in any of these or other configurations of a client device.

The memory 210 may be a hardware component configured to store data related to operations performed by the client device 110. As will be described in further detail below, the memory 210 may store the raw and processed sensory data that may be used with the enhancement functionality. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. Thus, based on the output from the display engine 240, the display device 215 may show data to the user of the client device 110. The transceiver 225 may be a hardware component configured to exchange data with the enhancement server 130 or the other client devices 115, 120 via the communications network 125.

The sensory components 230 may be one or more components that measure or generate raw sensory data. For example, the sensory components 230 may include imaging hardware components such as a camera configured to generate still images or video within a field of view of the camera. In another example, the sensory components 230 may include audio hardware components such as a microphone configured to generate audio data recorded from sounds capable of being detected by the microphone. In a further example, the sensory components 230 may include movement or location hardware components configured to detect movement of the client device 110 or a location of the client device 110. In this manner, the sensory components 230 may provide data to one or more of the engines 235-260.

In providing the enhancement functionality, the client device 110 may cooperate with the other client devices 115, 120 or the enhancement server 130. Accordingly, the processor 205 of the client device 110 may perform a plurality of operations in contributing a first aspect to the enhancement functionality. In a first operation, as described above, the interface engine 235 may be configured to provide a user interface associated with the enhancement functionality. The interface engine 235 may be implemented in a variety of manners. In a first manner, the interface engine 235 may utilize installed applications on the client device 110. For example, a browser application may be used to connect to a website hosted by the enhancement server 130. The browser application may then provide the user interface with data received from the enhancement server 130. In a second manner, the interface engine 235 may itself be an installed application such as a mobile device application. The mobile device application may connect to the other client devices 115, 120 or the enhancement server 130. The mobile device application may provide a generic or a proprietary user interface.

The user interface provided by the interface engine 235 may display various types of information, enable the user to enter information, and be utilized for data exchange operations. When displaying information, the user interface may include a display window in which captured data is shown using the display engine 240 (as will be described in detail below). For example, using the sensory components 230 and (as will be described in detail below) the sensory data engine 245, the display window may show a visual or audio capture of recorded data. As will be described in detail below, the display window may also show an enhanced display generated based on a combination of the client device's data and data obtained from other client devices or the enhancement server.

When receiving information being entered by the user, the user interface may be configured to register or log into a service associated with the enhancement functionality by receiving identification information entered by the user (e.g., via the I/O device 220). The user interface may also be configured to receive settings or personal preferences information entered by the user that may be managed by the profile engine 260 (as will be described in detail below). The user interface may further be configured to receive location information manually entered by the user that may be utilized by the location engine 255 (as will be described in detail below). For example, the location information may be a seat assignment associated with a purchased ticket that indicates a tier level, a section number, and a seat number.

When exchanging data with the other components of the system 100, the interface engine 235 may include background operations for data transmission and reception by using the transceiver 225. With data transmissions, the interface engine 235 may be configured to process and format data to be transmitted to the client devices 115, 120 or the enhancement server 130. The data transmission may include different types of data such as control data, registration data, recorded data (e.g., telemetry such as spatiotemporal imagery), associated metadata, etc. The data transmission may also be performed for a variety of reasons such as a manually triggered transmission by the user, an automated transmission by the mobile device application, in response to a request by the client devices 115, 120 or the enhancement server 130, etc. With data receptions, the interface engine 235 may receive data corresponding to or used to generate the enhanced display to be shown on the display window of the user interface. The data reception may be performed for a variety of reasons such as a manually triggered request for data by the user, a determined request by the mobile device application based on user preferences, a reception from an automated transmission by the enhancement server 130 or the client devices 115, 120, etc.

The display engine 240 may be configured to show data to a user including the enhanced display received from the enhancement server 130 or generate the enhanced display based on data received from the enhancement server 130. As noted above, the user interface of the interface engine 235 may include the display window that shows recorded data from sensory data captured by the sensory components 230 of the client device 110. The display window may also show the enhanced display by augmenting the recorded data being shown with recorded data from sensory data captured by sensory components of another client device. The display engine 240 may be configured to process and format the data to be shown in the display window of the user interface. For example, when the enhancement server 130 provides the data for the enhanced display, the display engine 240 may format the enhanced display within the display window, particularly if the display window is sized and positioned according to a user preference. In another example, when the enhancement server 130 provides the data to be used for the enhanced display, the display engine 240 may generate the enhanced display based on this received data and then format the enhanced display to be shown in the display window. In this manner, additional data that is not recorded data (e.g., overlay data) may be included in the enhanced display. It is noted that the formatting may relate to size and layout adjustments as well as incorporating the manner in which augmentations are included in the enhanced display. In a further example and as will be described in detail below, the display engine 240 may incorporate the features of the enhancement server 130 such that recorded data associated with captured sensory data from the other client devices 115, 120 may be received for the enhanced display to be generated.

The sensory data engine 245 may be configured to operate with the recording engine 250 by receiving raw sensory data for processing/formatting from the sensory components 230. As described above, the sensory components 230 may generate the raw sensory data corresponding to the type of sensory data being measured/generated by the sensory components (e.g., image sensory data by a camera, audio sensory data by a microphone, etc.). The sensory data engine 245 may receive the raw sensory data for processing/formatting such that the proper visual, audio, or other type of processed sensory data is generated. For example, the sensory components 230 may include a camera and a microphone which generates the corresponding raw sensory data. The sensory data engine 245 may process the raw sensory data and provide the processed sensory data to the display engine 240 which shows the recorded data in the display window of the user interface provided by the interface engine 235. In a particular example, with the sensory data being video, the processing may entail decompressing a video stream, mapping frames to a desired perspective plane (e.g., for a novel perspective enhancement), map the frames to a receiving device's video plane (e.g., to create a mosaic view, etc. With the sensory data being audio, the processing may entail detecting events (e.g., a goal), translating audio into text, etc.

It is noted that the sensory data engine 245 may include a further functionality of generating corresponding metadata associated with the raw sensory data while being captured by the sensory components 230. For example, the metadata may include a timestamp indicating when the raw sensory data was captured, geolocation data indicating where the raw sensory data was captured (e.g., operating in conjunction with the location engine 255), sensory component parameter data indicating the parameters used by the sensor component (e.g., calibration information of a camera), etc. This metadata may be associated with the corresponding sensory data such that recorded data that is transmitted (e.g., via the interface engine 235) to the enhancement server 130 or the client devices 115, 120 may also include the metadata.

The recording engine 250 may be configured to receive processed sensory data from the sensory data engine 245 and store the processed sensory data as recorded data. For example, the recorded data may be stored in the memory arrangement 210. As described above, the recorded data may be transmitted to the enhancement server 130 or the other client devices 115, 120 to be used as a basis for data augmentation or any other enhancement functionality. For example, the recorded data may provide a first display associated with a perspective as captured using the client device 110. In this manner, the recorded data serves as a basis of using the enhancement functionality. In another example, the recorded data may provide a second display associated with a perspective as captured using the client device 110. In this manner, the recorded data from the client device 110 serves as an augmentation for the second display of recorded data for the client device 115 or 120. It is again noted that incorporating the augmentation in the enhanced display may utilize any manner of fusing a plurality of corresponding data components to result in the enhanced display (e.g., a novel image perspective, a mosaic generation, a super resolution, an augmented reality, a detecting of spatiotemporal events, a measuring of statistical data (e.g., distance, speed, location, etc.), a receiving of commentary (e.g., audio, text, etc.) to the live event that matches the context of the receiving device's user/setting, etc.).

It is noted that the above description relates to showing the recorded data in the display window of the user interface. However, the use of the recorded data to be shown in the display window is only exemplary. As will become apparent below, the client device 110 may be configured to record the sensory data and therefore use the recorded data to be shown in the display window. For illustrative purposes, the description herein uses the recorded data for purposes of being shown in the display window. However, those skilled in the art will understand that the sensory data is not required to be recorded and the sensory data engine 245 may be used to process/format the raw sensory data which is then provided to the display engine 240 without recording by the recording engine 250. Accordingly, the recorded data used herein may also represent the sensory data.

The location engine 255 may be configured to determine a location of the client device 110 in a global manner or relative to a position within the venue 105. As noted above, the sensory components 230 may include location determining hardware components. For example, the sensory components 230 may include global positioning capabilities that generate location data. The location engine 255 may receive the location data to determine the geolocation of the client device 110. The sensory components 230 may also include further location determining components that may be used to determine a relative position, particularly in the venue 105. For example, the location engine 255 may receive signal strength information or other types of vector metrics to triangulate a position of the client device 110 in a two-dimensional or a three-dimensional capacity.

The location engine 255 may be configured in other manners to determine the location of the client device 110. For example, the location engine 255 may operate in conjunction with the interface engine 235. Specifically, the user interface provided by the interface engine 235 may request that a seating assignment be entered by the user. The location engine 255 may utilize the seating assignment input entered by the user to determine a relative location in the venue 105. Alternatively, the location engine 255 may transmit the seating assignment input to the enhancement server 130 which utilizes the relative location in the venue 105 to determine subsequent operations. In this manner, the seating assignment input may be used with a seating layout and field dimensions to enable a potential field of view of a device to be determined from capturing data from a certain seat.

In another example of other manners of determining the location of the client device 110, the location engine 255 may receive sensory data from the sensory components 230. For example, images or audio recorded by the client device 110 may be received by the location engine 255. The location engine 255 may be configured to determine the relative location of the client device 110 in the venue 105 using the sensory data. For example, the location engine 255 may instruct the interface engine 235 to prompt the user to center a camera's field of view at one or more landmarks in the venue 105 (e.g., a field goal post, a basketball backboard, etc.). Based on the camera parameters (which may be managed by the sensory data engine 245), the orientations, sizes, etc. of the landmarks may be used by the location engine 255 to determine the relative location in the venue 105 (e.g., using triangulation). Moreover, when one or more landmarks' locations are known, the location engine 255 may determine the client device's absolute location.

The profile engine 260 may be configured to manage settings or personal preferences of the user of the client device 110 with regard to how the enhancement functionality is to be used on the client device 110. Via the user interface provided by the interface engine 235, the profile engine 260 may receive inputs corresponding to the settings and personal preferences of the user. For example, the inputs may be information pertaining to the interests of the user and a current context of the event being attended by the user. In this manner, a profile of the user may be established for the user during the event. Accordingly, for an event being attended by the user, the user may create a corresponding profile to be used. The settings/preferences of the user may include various types of information such as an affiliation with a participant of the event (e.g., a team, a player, a performer, etc.), a demographic of the user, etc. The current context may relate to the current circumstances surrounding the user while attending the event. For example, the context may relate to attendance with family/colleagues, being a contributing freelance, etc. When the enhancement server 130 provides the enhancement functionality of generating the enhanced display, the profile engine 260 may provide the profile to the enhancement server 130 to determine the circumstances when the recorded data being shown on the display device 215 of the client device 110 is to be augmented into the enhanced display.

Based on the above operations performed by the client device 110, a user of the client device 110 may, in one instance, be provided the enhanced display in which recorded data using the sensory components 230 is shown in the display window of the user interface which may be augmented with recorded data using sensory components of another one or more of the client devices 115, 120. In another instance, the client device 110 may be the contributor of recorded data to be used in augmenting the display window of the recorded data being shown on one or more of the client devices 115, 120. Thus, according to an exemplary embodiment, the client devices 110-120 may be used with an equal priority where, based on the settings stored in each of the respective profile engines 260, any qualifying augmentation of recorded data may be used to generate the enhanced display.

However, it should be noted that the client devices 110-120 may also be utilized in which one or more of the client devices 110-120 may have a higher priority than the other client devices. For example, according to another exemplary embodiment, the client device 110 may be categorized as a priority client device. With this higher priority, the client device 110 may be acting on behalf of the production entity (that is producing the event). Thus, the client device 110 having the higher priority may receive privileges from the enhancement server 130 or from the enhancement functionality to facilitate high scale performance when digesting/ processing relatively large amounts of recorded data obtained from the other client devices 115, 120. For example, when the recorded data is received from a plurality of client devices and, then, further distributed to other or the same plurality of client devices, the enhancement server 130 may prioritize distribution so that the device with a highest priority may receive data in a priority manner (e.g., the highest data exchange rate).

Returning to the system 100 of FIG. 1, as noted above, the system 100 may also include the enhancement server 130. The enhancement server 130 may be a component of the system 100 that performs further operations associated with the enhancement functionality. Specifically, based on information received from the client devices 110-120, the enhancement server 130 may determine when the enhanced display is to be generated or also generate the enhanced display to be shown on select ones of the client devices 110-120.

As noted above, the operations of the enhancement server 130 may be implemented within the system 100 in a variety of manners. In a first example and as illustrated in the system 100 of FIG. 1, the enhancement server 130 may be implemented as a network component in which the client devices 110-120 may establish a connection for data exchange over the communications network 125. Thus, the enhancement server 130 may be a separate component of the system 100 that provides the further operations of the enhancement functionality. The enhancement server 130 may provide all the necessary data to the client devices 110-120 for the enhanced display to be rendered and shown. In a second example and as noted above, the enhancement server 130 may represent the further operations that are performed for the enhancement functionality. In this example, the further operations associated with the enhancement server 130 may be implemented in each of the client devices 110-120. For example, the display engine 240 or a further engine may be incorporated in the client device 110 to perform these further operations. Accordingly, the client device 110 may receive recorded data from the other client devices 115, 120 to determine when and how the enhanced display is to be used and created. Under this example, the system 100 may or may not include the enhancement server 130. For example, when a network of the client devices 110-120 is created using short-range communication protocols, the enhancement server 130 may be omitted. However, in another example, the enhancement server 130 may provide a forwarding or data exchange functionality in which recorded data and other data (e.g., requests, control data, etc.) may be exchanged between the client devices via the enhancement server 130 and the communications network 125. For illustrative purposes, the exemplary embodiments are described with regard to the system 100 shown in FIG. 1 where the enhancement server 130 is a separate component that provides the further operations of the enhancement functionality.

Figure 3:
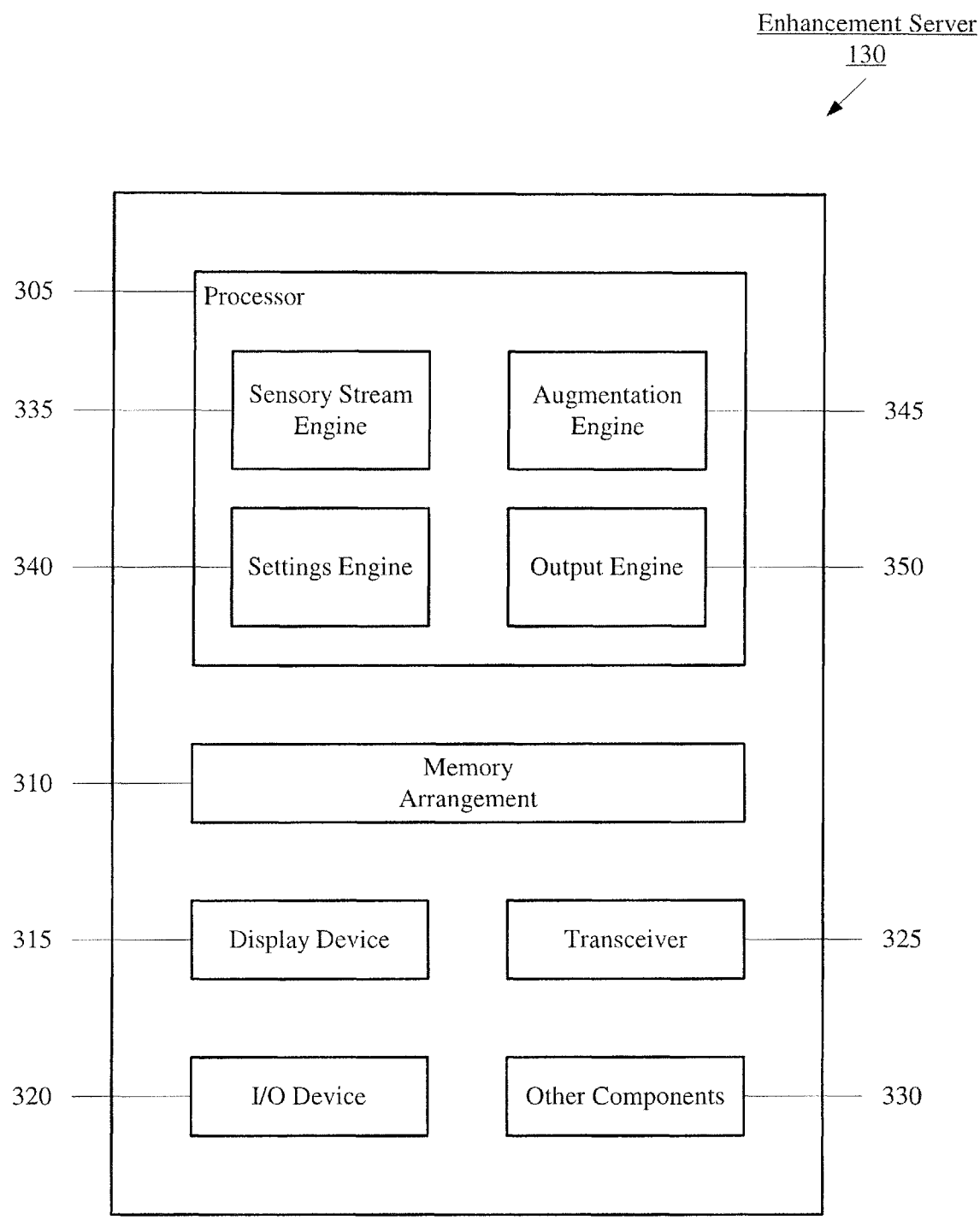
FIG. 3 shows an enhancement server of the system of FIG. 1 according to the exemplary embodiments.

FIG. 3 shows the enhancement server 130 of the system 100 of FIG. 1 according to the exemplary embodiments. Although the enhancement server 130 is described as a network component (specifically a server), the enhancement server 130 may be embodied in a variety of hardware components such as a portable device (e.g., a tablet, a smartphone, a laptop, etc.), a stationary device (e.g., a desktop terminal), incorporated into a website service, incorporated as a cloud device, etc. The enhancement server 130 may include a processor 305, a memory arrangement 310, a display device 315, an input and output (I/O) device 320, a transceiver 325, and other components 330 (e.g., an imager, an audio I/O device, a battery, a data acquisition device, ports to electrically connect the workflow server 130 to other electronic devices, etc.). The capabilities of these components may be substantially similar to the corresponding components of the client device 110, except that the processor 305 may be configured to utilize different engines in providing the further operations of the enhancement functionality.

Thus, the processor 305 may be configured to execute a plurality of engines of the enhancement server 130. Specifically, the engines may include a sensory stream engine 335, a settings engine 340, an augmentation engine 345, and an output engine 350. As will be described in further detail below, the sensory stream engine 335 may be configured to receive the recorded data from the client devices 110-120 and process the perspective from which the recorded data is captured. The settings engine 340 may be configured to receive the profiles (e.g., settings) of the client devices 110-120 such that the enhancement server 130 may identify when the enhancement functionality is applied to the client devices 110-120. The augmentation engine 345 may be configured to determine how the enhanced display is to be generated which may consider other augmentations in addition to including recorded data (e.g., a data overlay). The output engine 350 may be configured to format an output for the client devices 110-120 such that the appropriate enhanced display may be rendered on the client devices 110-120 (e.g., by the display engine 240).

It should again be noted that the above noted engines each being an application (e.g., a program) executed by the processor 305 is only exemplary. The functionality associated with the engines may also be represented as components of one or more multifunctional programs, a separate incorporated component of the enhancement server 130 or may be a modular component coupled to the enhancement server 130, e.g., an integrated circuit with or without firmware.

In providing the further operations of the enhancement functionality, the enhancement server 130 may cooperate with the client devices 110-120. Accordingly, the processor 305 of the enhancement server 130 may perform the plurality of further operations in contributing a second or multiple other aspects to the enhancement functionality. Specifically, the enhancement server 130 may serve as an arbitrator among the client devices 110-120 by ingesting recorded data transmitted by the client devices 110-120. The enhancement server 130 may then distribute the recorded data to the client devices 110-120 based on the profiles of the client devices for the enhanced display to be shown. The enhancement server 130 may also include further distribution features such as initiating a distribution of recorded data that may be determined to be of high interest to one or more of the client devices 110-120.

As described above, the sensory stream engine 335 may be configured to receive the recorded data from the client devices 110-120 and process the perspective from which the recorded data is captured. Specifically, the sensory stream engine 335 may process the recorded data which may be video streams (which may or may not include audio) received from the client devices 110-120 in the venue 105. The sensory stream engine 335 may manage and track the recorded data by associating the source from which the recorded data is received, namely an identity of the client devices 110-120.

It is noted that the sensory stream engine 335 may provide processing operations on the recorded data to determine other characteristics, particularly for the client device that transmitted the recorded data. For example, as described above, the client device 110 may include the location engine 255 that may be configured to utilize the recorded data to determine a relative location of the client device 110 in the venue 105. However, the location engine 255 of the client device 110 having this capability is only exemplary. In another exemplary embodiment, the sensory stream engine 335 may be configured with this capability. Thus, recorded data received from the client device 110 may be used to determine the location of the client device 110 in the venue 105 and also determine the perspective (e.g., orientation of client device's sensor) from which the recorded data is being captured and the device's sensor's field of view (i.e., the area of interest in the venue 105 that is covered).

The sensory stream engine 335 may also operate with the settings engine 340 (to be described in detail below) to exchange data with the client devices 110-120 in a variety of manners. In a first manner of receiving recorded data by the enhancement server 130, the client devices 110-120 may be configured to transmit any recorded data to the enhancement server 130 once captured and processed (e.g., via the sensory data engine 245). Accordingly, the sensory stream engine 335 may then process the recorded data from the client device 110 (and the other client devices 115, 120 that may also be transmitting recorded data). In a second manner of receiving recorded data by the enhancement server 130, the settings engine 340 may determine when a specific one or more of the client devices 110-120 are to provide the recorded data. The settings engine 340 may perform this determination based on an interest determined by one of the client devices 110-120 (e.g., tracking a game object). Thus, for devices that are currently covering a relevant field of view, the captured data may be directed to the interested device (e.g., after further processing by the enhancement server 130). Accordingly, the sensory stream engine 335 may transmit a corresponding request for the specified client device to transmit the recorded data. In a first manner of transmitting recorded data by the enhancement server 130, the sensory stream engine 335 may receive a request from a particular one of the client devices 110-120 and select/generate a corresponding recorded data to be provided in response to the request. In a second manner of transmitting recorded data by the enhancement server 130, the settings engine 340 may determine when a specific one or more of the client devices 110-120 are to be provided recorded data from other ones of the client devices 110-120. Thus, the sensory stream engine 335 may select/generate a corresponding recorded data based on the profile (e.g., settings or preferences) of the user associated with the specified client device.

The settings engine 340 may be configured to receive the profiles (e.g., settings) of the client devices 110-120 such that the enhancement server 130 may identify when the enhancement functionality is applied to the client devices 110-120. The profiles of the client devices 110-120 may include various types of information that may be used by the enhancement server 130 in determining different specifics and characteristics associated with the users of the client devices 110-120. As described above, the profiles of the client devices 110-120 including any respective settings or personal preferences of the user may be managed by the corresponding profile engine 260. The profiles may be specific to the event at the venue 105 being attended by the user. Thus, the settings engine 340 may receive the profiles from the client devices 110-120. The enhancement server 130 may receive the profiles from the client devices 110-120 whenever the profiles are generated or whenever a change or update is made to the profiles. In this manner, the profiles may be maintained in a current status for use by the enhancement server 130.

The settings engine 340 may be configured to determine when the enhanced display is used to augment recorded data of the client device 110 being shown on the display device 215 of the client device 110. As described above, the enhanced display may be based on recorded data from at least one of the client devices 115, 120. Thus, the settings engine 340 may perform this operation when an automated determination is made as to whether the enhanced display is to be provided (in contrast to when the client device 110 transmits a request for the enhanced display). For example, the profile for the client device 110 may include a preference for a particular athlete. Based on this information in the profile, the settings engine 340 may determine when this athlete is performing (e.g., at bat during a baseball game) based on any available information (e.g., recorded data received from the client devices 110-120, a schedule for the event, etc.). Accordingly, when this athlete is performing, the settings engine 340 may identify which of the profiles indicate a preference for this athlete and then determine how an enhanced display may be provided to enrich the viewing experience of the user. For example, the profile may indicate or the location engine 255 or the sensory stream engine 335 may determine a seating assignment and perspective in which the user of the client device 110 may see the athlete. The settings engine 340 may utilize this information to determine available recorded data from a different perspective based on the other profiles (e.g., seating assignments that provide a substantially different perspective). Thus, the settings engine 340 may determine how each user of the client devices 110-120 may prefer to utilize the services of the enhancement functionality. Accordingly, as described above, based on the settings/preferences in the profiles, the user may maintain at least a partial control of when, where, and how the enhanced display is provided. Based on the settings/preferences, the enhancement server 130 may be informed to monitor a current availability of relevant data (e.g., a complementary perspective captured by any other device). As will be described in detail below, this information provided by the settings engine 340 may be used to redistribute recorded data to specific client devices of corresponding users based on the settings/preferences in the profiles. For example, it may be desirable to show a right-handed batter in a baseball game from one perspective, while a left-handed batter is shown from an opposite perspective.

In another manner, the settings engine 340 may include a particular preference in which an augmentation is to be provided. In the above example, without this preference included in the profile, the settings engine 340 (or the augmentation engine 345) may determine how the augmentation is to be performed. However, if the preference is indicated, the augmentation may be generated based on this information. Accordingly, if the user provides a request or an automated determination is made that the enhanced display is to be generated and provided to the client device 110, the setting engine 340 may reference the profile to define how the augmentation is to be generated.

The users of the client devices 110-120 may also utilize a profile merge functionality. For example, a plurality of users of respective client devices may be attending the same event at the venue 105. The users may or may not be located at the same relative position in the venue 105 (e.g., a first user may be located in a first position and a second user may be located in a second position on an opposite end of the venue 105). However, the users may select to utilize the profile merge functionality in which a plurality of users may temporarily merge their profiles. Accordingly, a single profile of settings and preferences may represent a group of users. In this manner, a single profile may be used by the settings engine 340 to determine how to distribute recorded data to the respective client devices based on the combined settings or preferences of the merged profile.

The augmentation engine 345 may be configured to determine how the enhanced display is to be generated. Specifically, based on outputs from the sensory stream engine 335 and the settings engine 340, the augmentation engine 345 may generate the enhanced display for the client devices 110-120. As noted above, the enhanced display may include an augmentation in which a display window showing recorded data captured by the client device 110 is augmented with recorded data captured by one or more of the client devices 115, 120. Thus, using the information provided by the settings engine 340 (which is based on the profiles of the users of the client devices 110-120) and the recorded data received from the client devices 110-120 as processed by the sensory stream engine 335, the augmentation engine may be configured to identify which of the client devices 110-120 that the enhanced display is to be provided as well as generate the enhanced display by adding targeted content such as other recorded content prior to distribution to the identified client devices 110-120. In generating the enhanced display, where first recorded data is being shown on the client device 110, the augmentation engine 345 may determine how second recorded data from at least one of the client devices 115, 120 is to be incorporated into the first recorded data. For example, the augmentation engine 345 may determine a location within the first recorded data to add the second recorded data and in what image perspective in order, for example, to avoid covering any areas of interest within the first recorded data. The augmentation engine 345 may perform this operation in a variety of manners such as the second recorded data being inserted within the first recorded data (e.g., in a floating window), creating a split screen to show the second recorded data adjacent to the first recorded data, etc. Thus, using the profiles of the client devices, the augmentation engine 345 may first determine whether any of the client devices 110-120 is to be provided the enhanced display and then determine (which may also be based on the profiles) how the augmentation is to be incorporated to generate the enhanced display.

The augmentation engine 345 may be configured with a plurality of further functionalities. In a first example, the augmentation engine 345 may use information provided by the sensory stream engine 335 and the settings engine 340 to track a current spatial distribution of the client devices 110-120. For example, the relative locations of the client devices 110-120 to one another and the corresponding perspectives in the venue 105 may be tracked. Based on this mapping of the client devices 110-120 in the venue 105, the augmentation engine 345 may determine how the enhanced display is to be generated using a particular perspective. Based on the perspective of the recorded data being shown on one of the client devices 110-120 and the perspective of the recorded data that is to be used as the augmentation (as captured by another one of the client devices 110-120), the augmentation engine 345 may instruct the settings engine 340 to transmit a request or solicit inputs from the user of a selected one of the client devices 110-120 at certain locations having the proper perspective.

In an exemplary embodiment, the augmentation engine 345 may generate a request implemented as an alert signal which may be transmitted to a specific one of the client devices 110-120 or broadcast to the client devices 110-120. The alert signal may be sent to a user who is located at a desired perspective relative to an area of interest. Upon reception of the alert signal, the recorded data captured by the client device (e.g., client device 115) of the user may be transmitted to the enhancement server 130 (via the sensory stream engine 335) for further processing and distribution for the augmentation engine 345 to generate the enhanced display for another client device (e.g., client device 110). In another example, the alert signal may provide instructions to the user of the client device for which the recorded data is to be transmitted. Specifically, the augmentation engine 345 may generate a guide for the user to capture the recorded data in a particular manner at the perspective of the user. Accordingly, the user may adjust the sensory components 230 to capture the recorded data at the perspective of the user in a manner that provides the augmentation for the enhanced display (as determined by the augmentation engine 345).

In a second further functionality of the augmentation engine 345, the augmentation engine 345 may generate the enhanced display as a Novel View Synthesis (NVS). The NVS may be an augmentation that is used in the enhanced display in which a plurality of perspectives of an area of interest is provided to one of the client devices 110-120 or the enhancement server 130. The NVS may pertain to a character or object in the event (e.g., an athlete's performance). According to an exemplary embodiment, this feature may be one requested by the user or indicated in the profile of the user. Thus, the user may transmit a NVS request to the enhancement server 130 or the settings engine 340 may indicate that the NVS is to be used when a particular character/object is present in the event for a NVS augmentation. For example, the NVS augmentation may be one or more videos of an athlete from different perspectives. In a manner substantially similar to the above mechanism in which the enhanced display is generated, the NVS augmentation may involve identifying the client device that is to receive the NVS augmentation, determining which of the other client devices are located to capture recorded data at an advantageous perspective, request those client devices to transmit the desired captured recorded data, and generate the enhanced display with the NVS augmentation. It is again noted that the use of video as the sensory data is only exemplary. In a non-video example of the augmentation, the NVS augmentation may be adding live or documentary commentary in text or audio that is temporally or contextually associated with information or a perspective of the receiving device. In another non-video example of the augmentation, the NVS augmentation may be adding graphics with illustrations or statistics measuring performances of game participants. Those live statistics may be contrasted with historical performances.

In a third further functionality of the augmentation engine 345, the augmentation engine 345 may determine how recorded data captured by a first client device may complement recorded data captured by a second client device. In a first manner of determining complementary perspectives, the augmentation engine 345 may generate an enhanced display in which two related and successive incidents occur away from each other at the event. For example, a first client device may have captured first recorded data of a first character performing a first action (e.g., a tennis player serving the ball) while a second client device may have captured second recorded data of a second character performing a second action (e.g., another tennis player receiving the served ball). The augmentation engine 345 may provide an enhanced display in a complementary manner where the same area of interest is not shown at different perspective but two different areas of interest at two different perspectives are shown concurrently or subsequently. It is noted that the capturing of complementary perspectives may not utilize pre-planning or pre-coordination as may be used by a broadcaster with an intended split screen display. In contrast, according to the exemplary embodiments, a first user may direct a corresponding device at a certain attraction which may either implicitly or explicitly indicates to the enhancement server 130 that a second device's perspective of a related attraction may be complementary. Then, the enhancement server 130 may connect or channel the second device's captured data to the first device.

In a second manner of determining complementary perspectives, the augmentation engine 345 may determine how a plurality of perspectives of the same character or object may be included in the enhanced display (one perspective may be the recorded data of the client device receiving the enhanced display). For example, a first client device may have recorded data of an athlete at a first perspective (e.g., from behind) while a second client device may have recorded data of the same athlete at a second perspective (e.g., from the front). The augmentation engine 345 may determine that each of these client devices may be provided an improved viewing experience with a corresponding enhanced display where the first client device is provided the second perspective as an augmentation and the second client device is provided the first perspective as an augmentation. In another example, a first client device and a second client device may both have recorded data of an athlete at the same perspective but at a different zoom parameter. In a substantially similar way, the augmentation engine 345 may determine that each of these client devices may be provided an improved viewing experience with a corresponding enhanced display where the first client device is provided the second zoom view as an augmentation and the second client device is provided the first zoom view as an augmentation. Specifically, the augmentation engine 345 may determine that the two (or more) views are directed/focused on a common object (e.g., based on the devices' locations and orientations). The augmentation engine 345 may also determine what view is preferable at a certain time (e.g., a view that shows a non-occluded/frontal view of a player) and distribute that preferable view to the receiving device. Since the character or object may also move (often frequently) during the event, the augmentation engine 345 may also determine how the enhanced display is to show the recorded data as captured by the client device receiving the enhanced display along with any augmentation. For example, the augmentation engine 345 may determine that a first perspective may provide a better viewing experience over a second perspective. However, the client device may have captured the recorded data at the second perspective. Thus, the augmentation engine 345 may generate the enhanced display in which the first perspective is given a higher priority (e.g., a larger area of the display window, a more prominent position in the display window, etc.) over the second perspective. The augmentation engine 345 may be configured to dynamically perform this determination to update how the enhanced display is to be shown on the client devices 110-120 such that the more preferable perspective providing a better viewing experience is transitioned to a position in the display window showing the enhanced display.

In a third manner of determining complementary perspectives, the augmentation engine 345 may generate the enhanced display where an augmentation may relate to recorded data being shown to a user of a client device. For example, the recorded data may be a video being captured using the client device of a moment in the event. The augmentation engine 345 may determine how a complementary perspective may be used in the enhanced display based on this moment. Specifically, another client device or a camera of a production entity may be capturing complementary recorded data (e.g., a video of a commentator explaining the moment). For example, the receiving device's user may specify a certain enhancement type or may invite any enhancement that is currently available or that is related to a current interest, where the current interest may be determined by what is currently being captured or by setting parameters. The augmentation engine 345 may also utilize a measure of an association strength, so that the captured data that is most related may be the one to be provided to the receiving device. The augmentation engine 345 may generate the enhanced display using the complementary recorded data as an augmentation. In another manner, any related augmentation provided by the client device or device associated with a production entity having a high priority may be considered as complementary data and included in the enhanced display.

The augmentation engine 345 may also determine how the enhanced display is generated by considering other types of augmentations that may be included in the recorded data being shown. For example, the augmentation engine 345 may reference sources of information to determine information associated with a particular aspect of the event (e.g., a player, a performer, the venue 105, a history of the event, etc.). The augmentation engine 345 may generate a further augmentation in which this information is formatted to be included in the enhanced display. For example, the augmentation engine 345 may generate a data overlay (e.g., statistics, historical information, closed captioning, etc.). This further type of augmentation may also be determined based on the profiles of the client devices 110-120 and identifying for which of the client devices 110-120 the further augmentation is to be used. It is again noted that the determination may be based explicitly in the settings or implicitly by directing a sensory component at a certain object. For example, the augmentation engine 345 may employ face recognition on contents captured by multiple devices and integrate part of the contents that cover a certain player. Then, the enhancement server 130 may distribute the captured data to devices that indicated interest in that player (e.g., either by pointing the sensory component on the player or manually in the setting). It is noted that the augmentation engine 345 may utilize other types of further augmentations. For example, the augmentation engine 345 may determine and generate an interactive enhanced display in which the user may enter inputs to perform further operations (e.g., click a link being shown on the enhanced display and be forwarded to a website providing information). In another example, the augmentation engine 345 may be configured to determine or generate an advertisement to be included in the enhanced display.

The output engine 350 may be configured to format an output for the client devices 110-120 such that the appropriate enhanced display may be rendered on the client devices 110-120 (e.g., by the display engine 240). As described above, the enhanced display may be rendered in a variety of manners. The output engine 350 may be configured to provide the proper output such that the mechanism used to render the enhanced display on the client device 110-120 may be performed. In a first example, the enhancement server 130 may generate the enhanced display (e.g., using the augmentation engine 345). Accordingly, the enhanced display may be generated and the output engine 350 may be configured to transmit the generated enhanced display to the client device. As the enhanced display may include video that may be in real time, the enhanced display may be transmitted to the client device and further data used for the augmentations may be provided while the enhanced display is being shown on the client device. In a second example, the client device may generate the enhanced display. Accordingly, the augmentation engine 345 may generate the augmentation data (including any metadata such as positioning data, transitioning data, etc.). The output engine 350 may therefore be configured to transmit the augmentation data to the client device. Again, as the enhanced display may include an augmentation in real time, the augmentation data may be streamed to the client device that generates the enhanced display based on this augmentation data provided by the output engine 350.

It is noted that the enhancement server 130 may be configured with additional features. The additional features may be used by, for example, a production entity. Through the additional features, the production entity may provide data to the enhancement server 130 for the enhanced display to be generated in a more efficient or optimal manner. In a first example, the recorded data received using the sensory stream engine 335 may be analyzed and provided to the production entity. Accordingly, multiple videos or perspectives of a character or an object may indicate a line of sight to the character/object. This information may enable the production entity to improve localization and recognition of the character/object in the event (e.g., particularly when a plurality of athletes is performing concurrently such as in a team game). Thus, the client devices 110-120 may be constructively used as an agent of a tracking system. As noted above, the augmentation engine 345 may provide a guide for the client devices 110-120 to capture recorded data. In this manner, this guide feature may be used by the production entity. It is noted that the guide may be generated manually (e.g., by an administrator or broadcaster) or automatically. When generated automatically, the enhancement server 130 may request that a certain device point at a certain location (e.g., x,y,z). Devices that are aware of a location and orientation may, with aiding graphics, guide the user in orienting the device while capturing data. In a second example, the availability of multiple perspectives of the same character/object may be used by the production entity to optimize settings used by sensory components. Specifically, the multiple perspectives may be used for camera calibration. The camera calibration may refer to knowledge of a location of each pixel in a frame. Those skilled in the art will understand the significance of this information for each sensory component whose captured data is processed (either to extract content or to insert content). For example, one or more devices that are closer to a certain landmark on the field or current formation (e.g., scrimmage line) may provide localization information (e.g., 3D locations) that may be used by the production entity to calibrate the broadcast camera or to insert highlights. The camera calibration may also in turn be utilized by the enhancement server 130 in providing the enhanced display. In a third example, event information may be extracted based on the viewing behavior of the users of the client devices 110-120 (e.g., using the recorded data being captured). Using other information (e.g., the metadata indicating a location and orientation of the client devices) over time, the enhancement server 130 may be configured to identify an area of interest. This output may be used by the production entity for event recognition, camera control, a recommendation for the director, etc. In a particular scenario, at a high scale event where dozens of broadcast cameras of the production entity are used to form a final program cut, providing a center of attention based on recorded data received from a plurality of the client devices 110-120 may provide an indication of a recommendation as to which cameras of the production entity should be excluded or included from consideration.

As described in detail above, the exemplary embodiments utilize recorded data captured by client devices 110-120. As those skilled in the art will understand given the mechanisms described above for the exemplary embodiments, the enhancement server 130 may provide the enhanced display when at least one recorded data is received. However, with a plurality of recorded data being received, the enhancement server 130 may provide the enhanced display through different determinations that may optimize how the enhanced display is presented. Accordingly, the enhancement server 130, the production entity, the entity associated with the venue 105, or any other entity (e.g., an advertising entity) may employ incentives to encourage compliance from users in capturing the recorded data using the client devices 110-120, particularly when a request is provided by the enhancement server 130. A client device, upon delivery of the recorded data, may be compensated or recognized. For example, a monetary compensation may be provided. In another example, a recognition may be associated with the augmentation by indicating the source that provided the recorded data used in the augmentation.

Figure 4:
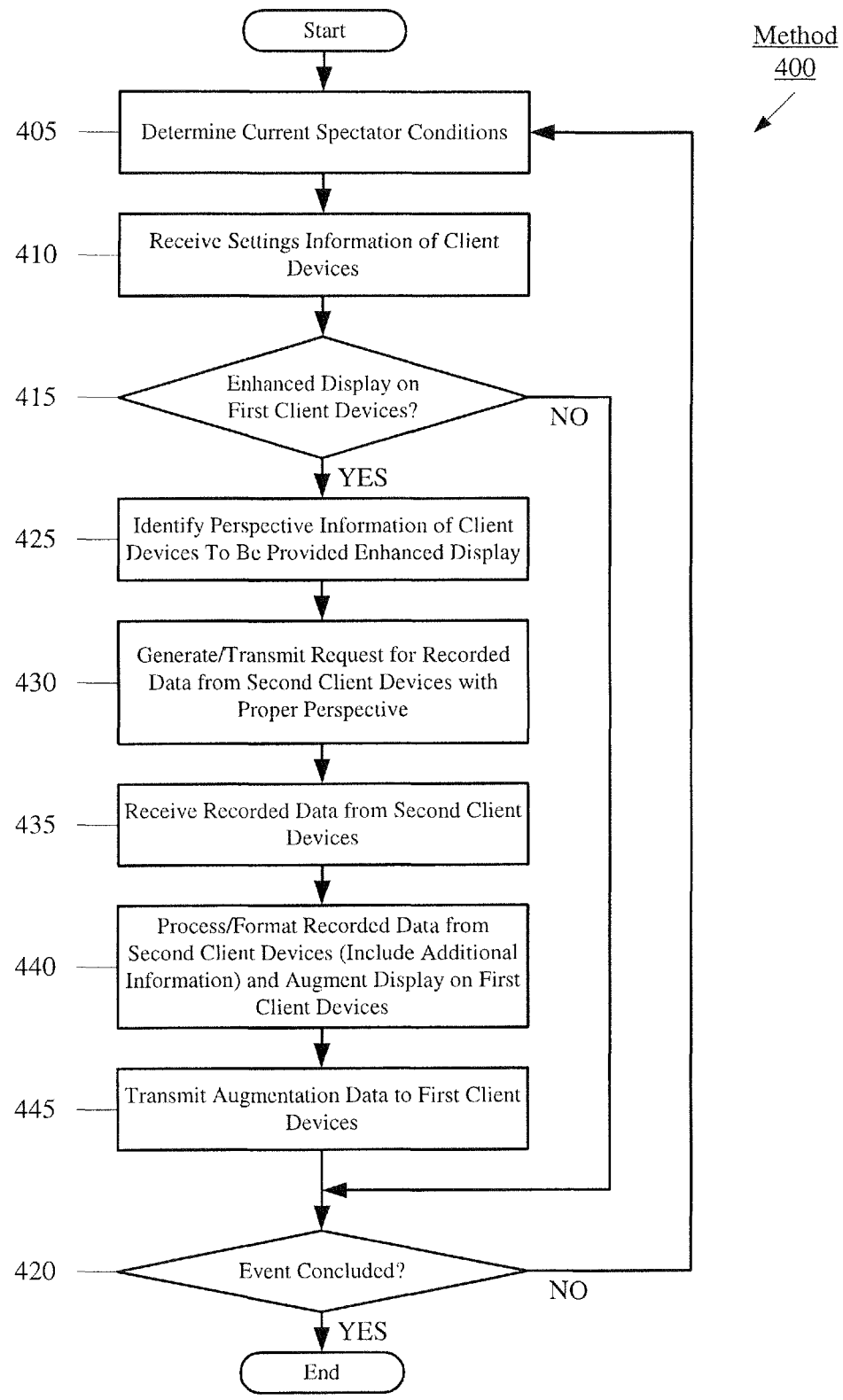
FIG. 4 shows a method for generating an augmented display according to the exemplary embodiments.

FIG. 4 shows a method 400 for generating an augmented display according to the exemplary embodiments. Specifically, the method 400 may relate to the mechanism of the exemplary embodiments in which the enhancement server 130 provides an enhanced display to at least one of the client devices 110-120. The method 400 is described according to the exemplary embodiment where the enhancement server 130 generates the augmentation data to the at least one of the client devices 110-120 such that the receiving client device generates and renders the enhanced display to be shown on the display device 215. However, it is noted that the enhancement server 130 may generate the enhanced display and provide the enhanced display to the receiving client device. The method 400 will be described from the perspective of the enhancement server 130. The method 400 will also be described with regard to the system 100 of FIG. 1, the client device 110, and the enhancement server 130 of FIG. 3. Specifically, the client device 110 may be the receiving client device to which the enhanced display is being provided.

In 405, the enhancement server 130 determines current spectator conditions. Specifically, the enhancement server 130 may utilize the sensory stream engine 335 or the settings engine 340 to determine or receive a location of the client devices 110-120 in the venue 105. As described above, the profile may include a location entered by the user such as a seating assignment in the venue. The location engine 255 of the client device or the sensory stream engine 335 of the enhancement server 130 may also be used to determine the location of the client device in the venue 105. In this manner, a perspective of each of the client devices may be determined relative to an area of interest in the venue 105.

In 410, the enhancement server 130 may receive settings information of the client devices 110-120. Specifically, the enhancement server 130 may utilize the settings engine 340 to receive profiles from the client devices 110-120. Based on the profiles, the enhancement server 130 may determine the conditions for when the enhanced display is to be provided to each of the client devices 110-120. As described above, the profiles may include settings or preferences associated with the users of the client devices 110-120. Accordingly, the profiles may directly indicate when the enhanced profile is to be provided or the profiles may be used to determine when the enhanced profile is to be provided.

In 415, the enhancement server 130 may determine whether one or more of the client devices 110-120 are to have the enhanced display provided. Initially, the enhancement server 130 may determine the moments or incidents that are occurring in the event to perform this determination. As noted above, based on the recorded data that is provided to the enhancement server 130 (e.g., from the client devices 110-120, from cameras associated with the venue 105 or a production entity, etc.), the enhancement server 130 may be capable of determining the moments or incidents such as characters or objects present in the event. Accordingly, in a first example, based on the how the event is progressing or information pertaining to the characters/objects of the event, the enhancement server 130 may utilize the settings information to determine whether one or more of the client devices 110-120 is to receive the enhanced display. For example, if a preference for a character is indicated in the profile of the user associated with the client device 110, the enhancement server 130 may determine when the character may be seen and provide the enhanced display during this time. In a second example, based on a request received from any one or more of the client devices 110-120, the enhanced display may be provided in response to the request.

If none of the client devices 110-120 are to have an enhanced display provided, the enhancement server 130 continues to 420. In 420, the enhancement server 130 determines if the event has concluded. If the event has concluded, the enhancement server 130 may terminate its operations. However, if the event is still ongoing, the enhancement server 130 may return to 405.

Returning to 415, if the enhancement server 130 determines that at least one of the client devices 110-120 is to be provided the enhanced display, the enhancement server 130 continues to 425. For illustrative purposes, the following describes when the client device 110 is to be provided the enhanced display. However, as described in detail above, any one or more of the client devices 110-120 may be provided the enhanced display and each enhanced display may be respectively provided for each of these one or more client devices 110-120. That is, the client device 110 may be provided a first enhanced display, the client device 115 may be provided a second enhanced display, and the client device 120 may be provided a third enhanced display, where each of the first, second, and third enhanced displays may be the same or different in any combination.

In 425, the enhancement server 130 identifies the perspective information of the client devices 110-120 which are to be provided the enhanced display. As described in 405, the perspective information may be received from the client devices 110-120. Thus, since the client device 110 is to be provided the enhanced display, the perspective of the client device 110 may be identified. Since the user of the client device 110 already has recorded data from the perspective of the client device 110, the enhancement server 130 may utilize this perspective information to determine the augmentation for the enhanced display (e.g., do not select recorded data having an identical or substantially similar angular/zoom perspective).

In 430, the enhancement server 130 determines which of the client devices 110-120 has a perspective that may be used as an augmentation for the enhanced display. For example, a proper perspective may be a linear opposite perspective, an angularly higher or lower perspective, a zoomed in or out perspective, etc. Based on the proper perspective that is selected, a selection among the client devices 110-120 may be performed. For illustrative purposes, the client device 115 may be determined to have the proper perspective for an augmentation to be included in the enhanced display for the client device 110. Again, the determination may be made explicitly using the settings of the client devices 110-120 or implicitly based on a direction or focus of a sensory component capturing data.

Upon this determination, in 430, the enhancement server 130 may generate a request for recorded data captured by the client device 115 having the proper perspective. That is, the request may indicate that the recorded data which is captured at the proper perspective is to be transmitted or streamed to the enhancement server 130. The enhancement server 130 may transmit the request to the client device 115. In 435, the enhancement server 130 receives the recorded data captured by the client device 115.

In 440, the enhancement server 130 processes or formats the recorded data received from the client device 115. Subsequently, the enhancement server 130 may generate augmentation data corresponding to how the recorded data from the client device 115 is to be incorporated as an augmentation in the display window of the client device 110 that is showing the recorded data captured by the client device 110. In 445, the enhancement server 130 transmits the augmentation data to the client device 110.

When the client device 110 receives the augmentation data, the client device 110 (via the display engine 240) may determine how the augmentation is to be included. For example, information corresponding to position, transition, intensity, etc. may be included in the augmentation data along with the captured data so that the display engine 240 may generate the proper enhanced display to be shown on the display device 215. It is noted that the proper enhanced display may refer to compliance with a receiving device's user's determination in settings that are entered for a profile or in another usage of the device (e.g., the field of view that a camera is steered).

After 445, the enhancement server 130 may continue to 420 to determine if the event has concluded or is ongoing. Thus, the enhancement server 130 may continue to provide the enhancement functionality whenever requested or determined to be used until the event has ended.

It should be noted that the method 400 may include addition operations. In a first example, after 445, the enhancement server 130 may determine if the augmentation data corresponds to a continuous streaming of recorded data from the client device 115 to be transmitted to the client device 110. If the recorded data from the client device 115 is non-live data (e.g., a replay from the perspective of the client device 115) or finite data, the augmentation data may include all the recorded data to be used in the augmentation. However, if the recorded data is a video or continuous, the enhancement server 130 may provide the subsequent augmentation data to the client device 110 until the augmentation has concluded. Accordingly, the enhancement server 130 may also determine when the recorded data has ended so that the augmentation data may cease to be transmitted to the client device 110.

In a second example, the augmentation data received from the enhancement server 130 may indicate a communication pathway for the recorded data from the client device 115 to reach the client device 110 so that the enhanced display may be generated on the client device 110. Accordingly, the enhancement server 130 may be configured to instruct how the client devices 110, 115 may create a communication bridge (e.g., over the communication network 125, over a short-range communication pathway, etc.) for the recorded data from the client device 115 to directly or indirectly be transmitted to the client device 110. For example, the enhancement server 130 may be an intermediary that receives the recorded data from the client device 115 and forwards the recorded data to the client device 110. In another example, the enhancement server 130 may include a functionality of an arbitrator that opportunistically connects the client devices 110, 115. In a particular implementation, a user of the client device 110 may indicate an interest of a player (e.g., by directing the camera at that player). The enhancement server 130 may monitor the data being captured to determine this interest and then identify that the client device 115 is currently focusing on that player. Alternatively, the enhancement server 130 may initiate a request for devices located nearby to capture that player. The enhancement server 130 may instruct that a device-to-device streaming operation is to be performed in directly transmitting the recorded data from the client device 115 to the client device 110. Accordingly, the enhancement server 130 may provide information to the client devices 110, 115 to facilitate a direct communication.

As noted above, the method 400 may be modified to be used where the system 100 does not include an enhancement server 130 but that the enhancement functionality is available on the client devices 110-120. Thus, through a communication pathway established among the client devices 110-120, the enhancement functionality described above may be performed. For example, the operations performed by the enhancement server 130 described above in the method 400 may be performed by the processor 205. Specifically, a determination of when the enhanced display is to be used may be performed by the processor 205. Subsequently, after having received the perspective information from the other client devices, a further determination may be made as to which of the other client devices may provide recorded data at a proper perspective for an augmentation to be included in the enhanced display. In this manner, each of the client devices 110-120 may be configured to show the recorded data captured by the individual client device while generating the enhanced display with an augmentation based on recorded data captured by other client devices.

The exemplary embodiments provide a device, system, and method of providing an enhanced display on a client device. The client device may be configured with sensory components that capture and store sensory data such as video, image, audio, etc. This recorded data may be shown on a display window of a display device of the client device. An enhancement functionality may be performed by an enhancement server that determines an augmentation to be included in the display window with the recorded data. Specifically, the augmentation may be recoded data captured by another client device having a different perspective. In this manner, the user of the client device may be able to view an area of interest in a venue at a plurality of different perspectives or be provided information regarding the area of interest.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:
1. A method, comprising:
   at a server:

connecting to a first client device and a second client device during an event via a communications network;

determining, during the event, the first client device is located at a first location in a venue, wherein the event is hosted at the venue;

selecting, during the event, the second client device that has a second location in the venue, wherein the selecting is based on the first and second location; and facilitating a transfer of data to the first client device during the event based on selecting the second client device, wherein the data is captured by the second client device and is to be used to generate a display by the first client device.

2. The method of claim 1, wherein facilitating the transfer of data comprises:
receiving, by the server, the data from the second client device; and
transferring, by the server, the data to the first client device.

3. The method of claim 1, wherein facilitating the transfer of data comprises:
transmitting, by the server, an instruction to the first client device and the second client device, wherein the instruction indicates to the first client device and the second client device how the second data is to be transferred from the second client device to the first client device.

4. The method of claim 1, wherein the first client device and the second client device are associated with respective users attending the event at the venue.

5. The method of claim 1, further comprising:
determining the first client device has a first perspective of the event hosted at the venue and the second client device has a second perspective of the event; and
wherein the selecting is further based on the first perspective and the second perspective.

6. The method of claim 5, wherein the first perspective of the event is of a first area of interest and the second perspective of the event is of a second area of interest.

7. The method of claim 1, wherein the data comprises at least one of video data, image data, audio data, textual data and graphics.

8. The method of claim 1, further comprising:
transmitting a guide to the second device, the guide indicating a manner of how the data is to be captured.

9. The method of claim 1, wherein a first portion of the display is based on the data captured by the second device and a second portion of the display is based on further data captured by the first client device.

10. A server, comprising:
a transceiver configured to communicate with a plurality of client devices during an event via a communications network; and
a processor, configured to perform operation comprising:
determining, during the event, a first client device is located at a first location in a venue, wherein the event is hosted at the venue;

selecting, during the event, a second client device that has a second location in the venue, wherein the selecting is based on the first and second location; and facilitating a transfer of data to the first client device during the event based on selecting the second client device, wherein the data is captured by the second device, associated with an event at the venue and is to be used to generate a display by the first client device.

11. The server of claim 10, wherein facilitating the transfer of data comprises:
receiving the data from the second client device; and
transferring the data to the first client device.

12. The server of claim 10, wherein facilitating the transfer of data comprises:
transmitting an instruction to the first client device and the second client device, wherein the instruction indicates to the first client device and the second client device how the second data is to be transferred from the second client device to the first client device.

13. The server of claim 10, wherein at least one of the first location and the second location are determined based on user input.

14. The server of claim 13, wherein the user input indicates at least one of a tier, a section number or a seat number corresponding to the venue.

15. The server of claim 10, wherein at least one of the first location and the second location are determined based on geolocation metadata.

16. The server of claim 6, wherein the second location is determined based on camera parameters for the second client device.

17. The server of claim 10, wherein the second location is determined based on identifying a landmark in the venue within a camera field of view for the second client device.

18. The server of claim 10, wherein the data comprises at least one of video data, image data, audio data, textual data and graphics.

19. The server of claim 10, further comprising:
receiving settings from the first client device, wherein the settings define a preferred area of interest from which the data is captured.

20. A method, comprising:
at a client device:
capturing data of an area of interest of an event hosted at a venue, wherein the client device is located at a first location in the venue;
transmitting, during the event, a request for further data, wherein the data is to be incorporated with the further data to generate a display by the client device during the event; and
receiving, during the event, the further data captured by a further client device, wherein the further client device is located at a second location in the venue and is selected by a server from one of a plurality of further device configured to communicate with the server based on the first location and the second location.

* * * * *